W. A. BUTLER.
SAFETY-PIN SHIELD.

No. 189,425. Patented April 10, 1877.

Witnesses
John Becker
Fred. Haynes

William A. Butler
by his Attorneys
Brown & Allen

UNITED STATES PATENT OFFICE.

WILLIAM A. BUTLER, OF NEW YORK, N. Y.

IMPROVEMENT IN SAFETY-PIN SHIELDS.

Specification forming part of Letters Patent No. 189,425, dated April 10, 1877; application filed March 14, 1877.

*To all whom it may concern:*

Be it known that I, WILLIAM A. BUTLER, of the city, county, and State of New York, have invented an Improvement in Safety-Pins; and I hereby declare that the following is a full, clear, and exact description of the same, reference being had to the accompanying drawing, forming part of this specification.

My invention relates to the shields of safety-pins; and has for its object the attainment of greater economy of material and labor in the manufacture of such pins.

The invention consists in a peculiar method of cutting the blank for a safety-pin shield, in bending said blank, and joining the lateral borders of the same to leave a hollow, into which the point of the pin may enter when in use.

Figure 1:
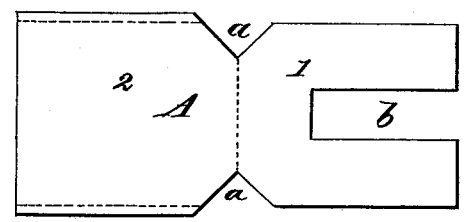
Figure 2:
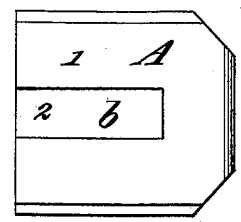
Figure 3:
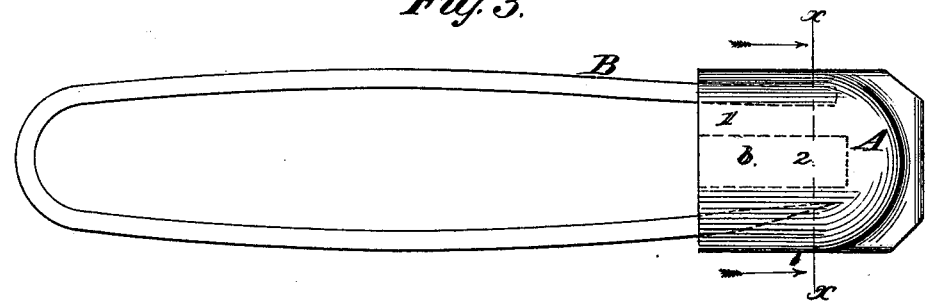

Figure 1 in the drawing represents the metal blank for a safety-pin shield constructed in accordance with my invention. Fig. 2 illustrates the method of bending the same and joining the lateral borders thereof. Fig. 3 represents a safety-pin with the shield attached thereto, and Fig. 4 a cross-section on the line $x\ x$ in Fig. 3.

A represents the shield in different stages of its manufacture, and B the pin attached to said shield, as hereinafter described, said shield and pin together forming a safety-pin.

In forming the shield, I first cut from sheet metal a blank, represented in Fig. 1. Said blank has two equal and similar V-shaped notches, $a$, cut in its opposite sides, and a longitudinal rectangular slot or notch, $b$, is cut in one of its ends. That part of said blank numbered 2, extending from the notches $a$, on the side of said notches opposite the slot $b$, is wider than the part of said blank numbered 1, the difference in width being indicated by dotted lines along the borders in Fig. 1. The said blank is formed, in the manufacture of the same, by a single stroke of a punch, and all the scrap metal in its formation consists in the pieces cut out of the notches $a$ and $b$—an important saving over other shields formed by cutting blanks from sheet metal, and subsequently joining their edges, or striking them up into a cup form.

Figure 4:

The blank, cut as described, is next bent double on the dotted line joining the vertexes of the notches $a$ in Fig. 1, a former being interposed to form the concavity $c$ in part 2, Fig. 4, of said blank. The lateral borders of part 2 are then turned down over part 1 of said blank, and fastened thereto by soldering or lap-joint, or other suitable means.

The unpointed end of the pin B is inserted in the shield, as shown in Figs. 3 and 4, and is attached to the shield by soldering or other suitable means. The notch $b$ serves as an opening to admit the point of the pin within the shield.

Shields for safety-pins, manufactured in the manner described, may be made with a considerable economy of metal and labor as compared with those hitherto made.

I claim—

A safety-pin shield made of the blank A, with the notches $a$ and $b$ formed therein in relation with each other, and having the part 1 bent over the part 2, and the lateral borders of said parts joined, substantially as and for the purpose set forth.

WM. A. BUTLER.

Witnesses:
   MICHAEL RYAN,
   FRED. HAYNES.